`3,823,081`
ACID MINE WATER TREATMENT PROCESS
Richard W. Treharne, Xenia, and David E. Wright, Dayton, Ohio, assignors to Kettering Scientific Research, Inc., Yellow Springs, Ohio
Filed Dec. 18, 1972, Ser. No. 316,339
Int. Cl. C02c 5/12
U.S. Cl. 204—151      10 Claims

ABSTRACT OF THE DISCLOSURE

A process for electrolytically converting acid mine water to potable drinking water having a neutral pH and a negligible iron content is claimed. The electrolytic cell used in the present treatment process has a cathode compartment wherein the pH of the acid mine water is driven basic and an iron hydroxide precipitate is formed. A sand barrier separates the cathode compartment from the anode compartment. In the anode compartment the pH is driven more acidic as sulfuric acid is concentrated. Electrolytic hydrogen evolved in the cathode compartment and electrolytic oxygen evolved in the anode compartment are possible by-products as are the sulfuric acid produced and iron from the iron precipitate produced. Alternatively, the evolved hydrogen and oxygen may be used within the electrolytic system to increase the efficiency thereof.

BACKGROUND OF THE INVENTION

The present invention relates to a process for abating water pollution from acid mine drainage and more particularly to an electrolytic process for conversion of acid mine water to potable water.

Acid mine water wastes create serious pollution problems in many areas of the country. Abandoned coal mines, as well as active mining operations, continuously leach large quantities of iron and sulfur containing pollutants into adjoining streams, lakes, and rivers. Sulfur bacteria feeding on the mine effluents, and/or other oxidizing chemical reactions, create strongly acidic water (as low as pH 2) which kills most aquatic life and renders the water useless for many human needs.

Several methods for correcting this pollution problem have been devised. The most common technique requires the use of lime or limestone as a neutralizing media. This technique creates a serious sludge problem in that calcium sulfate, as well as iron hydroxide, is precipitated. Other techniques of purifying acid mine water such as reverse osmosis, electro-dialysis, flash distillation and ion exchange have been tried with varying degreees of success but better methods of treating acid mine water remain needed.

Electrolytic techniques for the treatment of polluted water have also been studied previously. However, all of the systems proposed to date employ expensive, short-lived membranes and/or costly anode type materials. In addition, it has still been found necessary to add chemical additives (neutralizers or pre-neutralizers) in various stages of the process.

It is also known that the pH of swimming pools may be controlled by the release of chlorine gas from an electrolytic cell (see U.S. Pat. 3,361,663) and that electrolytic treatment of water which contains metal ions produces metal hydroxides (see U.S. Pats. 2,667,454; and 3,006,826). Similarly, it is known that electrolysis may be used to purify metal salt solutions (see U.S. Pat. 3,347,761). However, none of these treatment processes, even though electrolytic in nature, relates to the electrolytic production of potable water from acid mine water. Nor are they directly adaptable to such an operation.

Therefore, up until the time of the present invention the industry was searching for an economical and efficient way of abating acid mine water pollution. The treatment process of the present invention has been found to effectively purify acid mine water without the attendant disadvantages of the prior art processes.

SUMMARY OF THE INVENTION

In accordance with the present invention, an electrolytic process is used to treat acid mine water and convert it to potable water. Unlike previously proposed electrolytic systems, the one of the present invention does not require the use of expensive, short-lived ion exchange membranes. Instead, it has been found possible to use an inexpensive sand barrier in place of the ion exchange membranes which have previously been used to separate the anode and cathode compartments. In addition to sand, a glass bead barrier may also be used.

Thus, there is provided a cathode compartment separated from the anode compartment by a sand barrier supported by a porous material. The acid mine water enters into the cathode compartment which preferably contains a hollow cathode although other shaped cathodes also could be used. During electrolysis the pH in the cathcathode compartment is driven more basic as hydrogen gas is evolved leaving behind an excess of hydroxyl ($OH^-$) ions. These hydroxyl ions then combine with the iron contaminant present in the acid mine water to form iron hydroxide, $Fe(OH)_3$. As the pH in the cathode compartment increases, a precipitate of mainly iron hydroxide forms which can be removed by filtering or in a settling basis. The resultant product is potable water which is neutral in pH and has a negligible iron content.

In the anode compartment the pH is driven more acidic as oxygen gas is evolved, leaving behind an excess of hydrogen ions ($H^+$). At the same time, sulfate ions ($SO_4^=$) are attracted to the anode and combine with the hydrogen ions to increase the sulfuric acid, $H_2SO_4$, content in the anode compartment. The $H_2SO_4$ acid can be further concentrated by electrolysis or fractional distillation to obtain a marketable by-product from the process. It should be noted that other types of acids, such as HCl and $HNO_3$ may also be present to a lesser extent in the acid mine water.

Other by-products include the electrolytic hydrogen and oxygen produced by the process. If desired, it is also possible to make use of this electrolytic oxygen and hydrogen in the treatment process itself, rather than marketing them as by-products. For example, the hydrogen evolved in the cathode compartment can be used to reduce the iron hydroxide precipitate (from the cathode compartment) to high iron content filings which can be extracted magnetically as a further by-product. Likewise, the oxygen evolved in anode compartment can be used to increase the rate of precipitation of iron hydroxide in acid mine water. The electrolytic oxygen, or preferably ozone foamed from said oxygen, can be fed back into the system to accelerate $FE(OH)_3$ precipitation and thus contribute to the overall efficiency of the process.

In addition to the advantage arising from the use of a sand barrier in place of an ion exchange membrane, other advantageous features of the present invention include (1) the use of relatively inexpensive, corrosion resistant anodes (for example, ones of high silicon content iron), and (2) the elimination of any need for chemical additives or neutralizers. With the treatment process of the present invention, it is possible to produce potable water from acid mine water at an operating cost of less than 50 cents per 1,000 gallons of treated water.

Accordingly, it is a primary object of the present invention to provide an improved process for treating acid mine water.

Another object of the invention is to provide an electrolytic process for converting acid mine water to safe drinking water without the use of ion exchange membranes, costly anode materials, or the addition of chemical neutralizers.

Another object of the present invention is to provide an electrolytic process wherein acid mine water enters a cathode compartment, which is separated from an anode compartment by a sand barrier, and after filtration of the Fe(OH)$_3$ precipitate exists in the form of potable water having a neutral pH and a low iron content.

It is further an object of the present invention to recover as by-products of the treatment process oxygen, hydrogen, iron, sulfuric acid, and possibly other trace metals.

It is still a further object of the present invention to utilize the evolved hydrogen to reduce the precipitated Fe(OH)$_3$ to iron filings and the evolved oxygen to increase the rate of precipitation of the Fe(OH)$_3$.

Other objects and advantages of the present invention will be apparent from the following description, the accompanying drawing and the appended claims.

DESCRIPTION OF THE PREFERRED EMBODIMENTS

Figure 1:
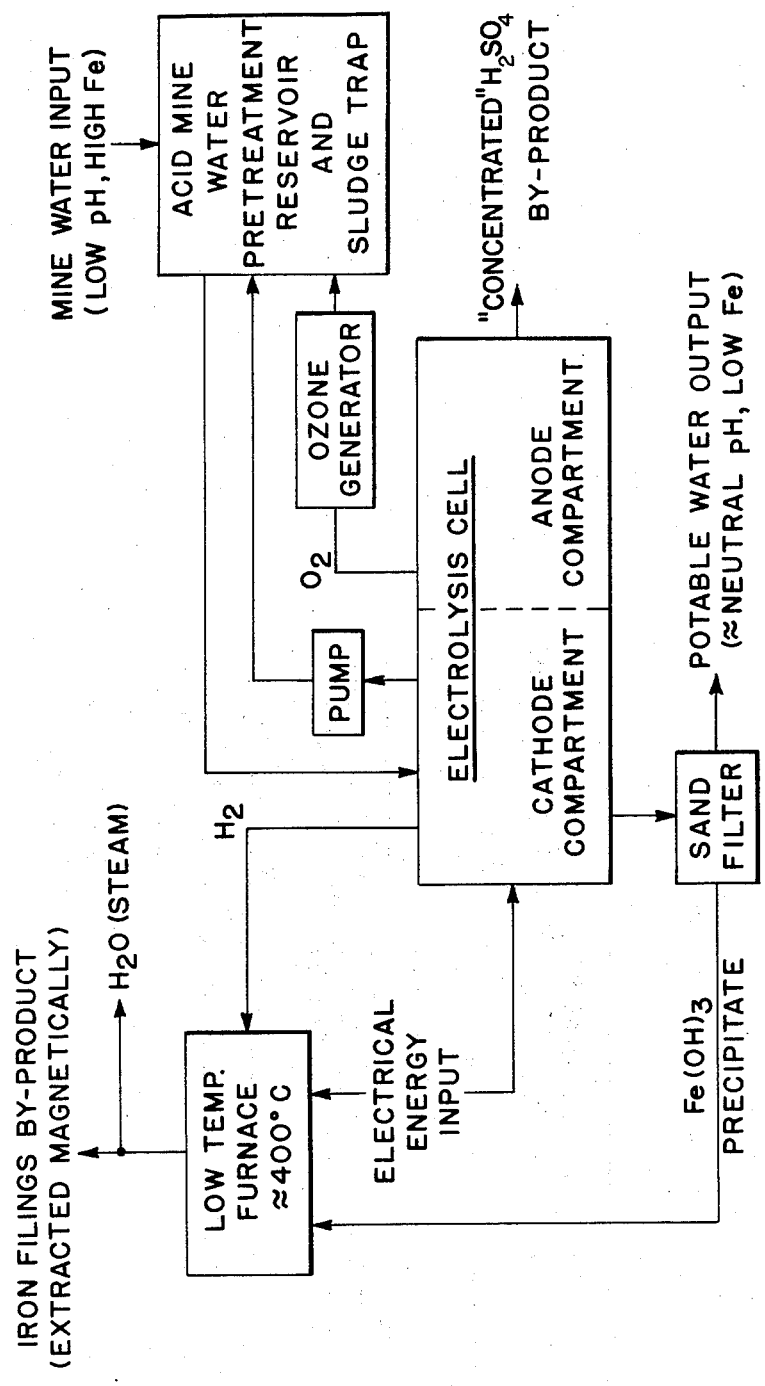
FIG. 1 is a flow diagram of the preferred process for electrolytically treating acid mine water.

Referring to FIG. 1, which is a flow diagram of a preferred embodiment of the invention, there is shown an acid mine water input. Typically such acid mine water has a low pH and a high iron content. For example, acid mine water obtained from a mine exit in the Lake Hope, Ohio, watershed region had a pH of 2.5 with an iron and other metal content of 500–1000 p.p.m. The acid content is approximately 2.4 pounds H$_2$SO$_4$ per 1,000 gallons effluent and the iron content is in the range of 4 to 8 pounds iron per 1,000 gallons. However, both the acid and iron content appear to vary seasonally. The mine effluent does not sustain any visible aquatic life.

As illustrated in FIG. 1, the acid mine water enters a pretreatment reservoir where the iron and other metals in the acid mine water may be preoxidized, if desired. This may be done by use of the oxygen evolved in the anode compartment. As shown, the oxygen may be converted to ozone by an ozone generator, the ozone being a better oxidizer for the instant purpose. However, this is not an essential step in the process since the oxygen produced or even air may be used as the oxidizer. In any event, the oxygen or ozone can be used to pre-oxidize the acid mine water to increase the rate of precipitation of iron hydroxide, and thus increases the efficiency of the system.

The pretreatment reservoir also serves as a sludge trap to remove as much Fe(OH)$_3$ as possible and to prevent certain large contaminants, such as leaves, sticks, etc., from being pumped into the electrolysis cell. Such contaminants may foul up both the pumping mechanism and the cell itself, if not removed prior to the treatment process.

Figure 2:
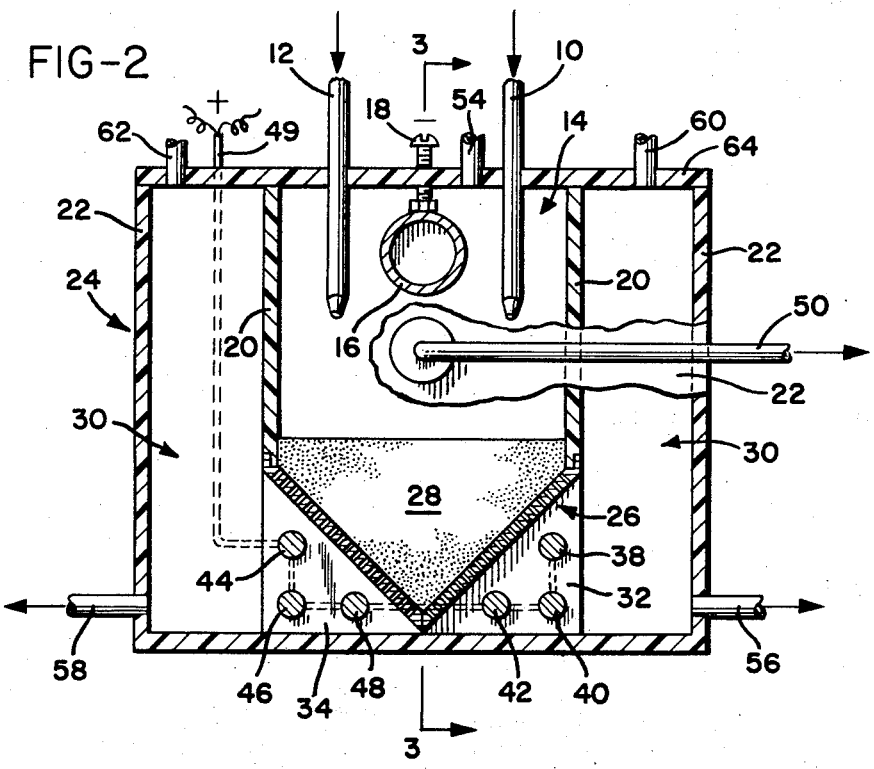
FIG. 2 is a cross-sectional view of the electrolytic cell used in the present invention.
Figure 3:
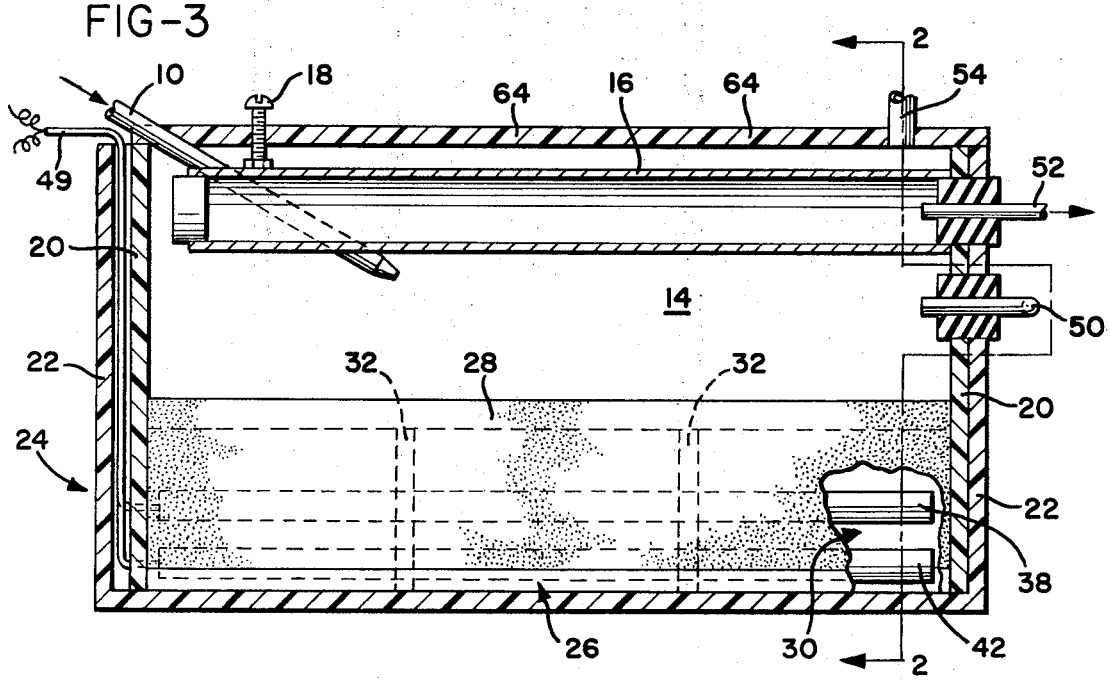
FIG. 3 is also a cross-sectional view, along another dimension, of the same electrolytic cell shown in FIG. 2.

As shown in the flow diagram a pump is used to transfer the acid mine water from the pretreatment reservoir to the cathode compartment and to circulate a part of the water from the cathode compartment back through the pretreatment chamber. Referring to FIGS. 2 and 3, input jets 10 and 12 are used to introduce the acid mine water into cathode compartment 14. Inside the cathode compartment 14 is a hollow cathode 16 which is attached by means of bolt 18 to the negative end of a power source. The cathode may be cast iron, stainless steel, carbon, or any similar type cathode material.

The cathode compartment walls 20, as well as the walls 22 of the electrolysis cell 24, are made of a non-conducting material such as plastic, glass, or cement. The bottom 26 of the cathode compartment is a non-conductive, porous material or material rendered porous. It may be, for example, plastic or concrete with holes in it, backed by a fiberglass cloth. The bottom 26 supports the sand barrier 28 which separates the cathode compartment 14 from the anode compartment 30. The porous support material, forming a V-shaped bottom 26 of the cathode compartment, is itself supported by a series of triangular shaped supports or posts 32 and 34 on each side of the "V." These posts are spaced intermittently along the bottom 26 to permit flow of the liquid within the anode compartment 30.

The two halves of the anode compartment 30 are, however, partially separated (but not isolated) by the sand barrier 28 and the porous bottom 26 of the cathode compartment. Therefore, it has been found desirable to use two series of anodes 38, 40, 42 and 44, 46 and 48, one series on each side of the sand barrier. The anodes may be of iron, stainless steel, carbon, etc. Preferably, however, they are made of a high silicon content iron which does not corrode as rapidly as the above mentioned materials. Anodes such as those sold under the trademarks Duriron and Durichlor by The Duriron Company, Inc. are particularly effective. The anodes are connected via electrical line 49 to the positive end of a power source.

During electrolysis the acid mine water in the cathode compartment becomes more basic as hydrogen gas is evolved leaving behind an excess of hydroxyl (OH−) ions. As the pH in the cathode compartment increases a precipitate of mainly iron hydroxide, Fe(OH)$_3$, forms which can be removed by filtering. In FIGS. 2 and 3 there is shown a line 50 which is attached to a pump (not shown). A part of the treated water, and especially that part containing Fe(OH)$_3$ precipitate, is pumped back through the pretreatment reservoir where a large percentage of the iron hydroxide precipitate is removed by the sludge trap. The filtered water as well as newly added acid mine water is then pumped back into the cathode compartment for additional treatment.

By this recycling step, water of acceptable purity is produced and released downstream. Such water exits from output drain 52 and is thereafter passed through a sand filter to remove any remaining iron hydroxide or passed through a second, similar type cell for further teatment. After filtering, the exit water is potable. It can be controlled by the instant treatment process to have a pH of 6–8 and an iron content of less than 1 p.p.m., depending partly on the pH.

Treating acid mine water from the Lake Hope, Ohio, watershed has revealed that iron and other metals are precipitated at the rate of 4 to 8 pounds per 1,000 gallons of untreated acid mine water. While the contents of the precipitate vary by location and season, a partial analysis of one typical sample obtained by reduction of the precipitate is shown in the following table:

TABLE I

| | Percent |
|---|---|
| Fe | 30.50 |
| Al | 12.00 |
| Zn | 3.40 |
| Si | 3.60 |
| Mg | 2.90 |
| Ca | 1.40 |
| Cr | .46 |
| Cu | .46 |
| Ni | .54 |
| Mn | .75 |
| Co | .05 |

Remainder believed to be mostly oxygen and hydrogen (from hydroxides).

Since the precipitate contains a large percentage of iron in the form of iron hydroxide, it may be collected at the various filters and further treated in a reducing furnace in the presence of hydrogen at approximately 400° C. This reduces the $Fe(OH)_3$ to high content iron filings, giving off steam at the same time. The iron filings may then be extracted magnetically and sold as a by-product. Alternatively, iron and other metals can be recovered from the precipitate as electrolytic iron by electrolysis at about pH 1.6 and ambient temperature.

The hydrogen source for the reducing furnace can be supplied by the evolved hydrogen from the cathode compartment 14. During electrolysis, hydrogen is evolved at the hollow cathode 16 and may be collected from line 54. It is possible to feed the hydrogen directly into the reducing furnace, or if desired, it may be collected and sold as a by-product. Likewise, if it is not desired to collect the hydrogen, an open cell may be used and the hydrogen released into the atmosphere.

In the anode compartment 30, electrolysis drives the pH more acidic as oxygen gas is evolved leaving behind an excess of hydrogen ($H^+$) ions. At the same time, sulfate ions ($SO_4^=$) are attracted to the anodes increasing the sulfuric acid ($H_2SO_4$) content in the anode compartment. A decrease in the pH of the anode compartment from 2.6 to 0.6 or lower during electrolysis has been observed.

The sulfuric acid concentrated in the anode compartment 30 is collected through drains 56 and 58 (FIG. 2). This acid can be further concentrated by electrolysis or fractional distillation to obtain a marketable by-product from the process. In particular, the reclaimed acid, even in its non-pure state, appears to be applicable as a "pickling" acid for the iron and steel industry. Reclaimed sulfuric acid from the anode water has an acid content of 24 pounds per 1,000 gallons (pH 1.2), nearly a tenfold increase in concentration over the entering acid mine water.

The oxygen evolved in the anode compartment 30 can be collected through lines 60 and 62. It is possible to sell the electrolytic oxygen as collected as a by-product. As previously mentioned, it is also possible to use it, or ozone produced from it, to increase the rate of precipitation of iron hydroxide by feeding it back into the pretreatment reservoir. Again, if desired, upper plate 64 can be omitted and the oxygen from the anode compartment 30 as well as the hydrogen from the cathode compartment 14 can be released into the atmosphere.

Electrolysis cells of all dimensions may be used in the present invention to obtain whatever operating capacity desired. For example, a laboratory model of 14 x 9 x 7 inches is capable of treating up to one gallon per hour, depending on the conditions of the acid mine water treated. The electrical energy requirement of such a system range from 100 to 200 watt-hours per gallon of treated water.

Likewise, a cell of approximately 4 x 3 x 2 feet is capable of treating 1,000 gallons per day. It is possible with such a system to operate at a cost of less than 50 cents per 1,000 gallons of treated water. Optimizing by-product recovery lowers the overall operating costs. Therefore, the operating costs of large scale systems (100,000 gallons per day or greater) are economically more attractive. However, one advantage of a 1,000 gallon per day system is that because of its dimensions portable operation is possible and it may be moved from one site to another.

It should be noted with any size system desired, it is possible to produce potable water with a negligible acid and iron content. In addition, as described in copending application Ser. No. 89,983, filed Nov. 16, 1970, electrolysis under controlled conditions can destroy many forms of bacteria, including *E. coli, R. rubrum,* Chromatium, Azotobacter, *R. rubrum* mutant, and the like. Therefore, it is possible to produce water completely safe for human consumption. In fact, treated water produced by the present process has been analyzed and approved satisfactory for drinking by the Green County (Ohio) Health Department. The output water from the present treatment system sustains all forms of aquatic plant and animal life.

While the method herein described constitutes a preferred embodiment of the invention, it is to be understood that the invention is not limited to this precise method, and that changes may be made therein without departing from the scope of the invention, which is defined in the appended claims.

What is claimed is:

1. A process for electrolytically treating acid mine water including the steps of:
    (a) introducing acid mine water into the cathode compartment of an electrolysis cell, said cathode compartment separated from the anode compartment by a sand barrier,
    (b) electrolyzing said acid mine water in said cathode compartment to drive the pH more basic, evolve hydrogen, and produce an iron hydroxide precipitate,
    (c) concentrating sulfuric acid in said anode compartment as oxygen is evolved and the pH in said anode compartment is driven more acidic, and
    (d) filtering the water produced in said cathode compartment to remove the iron hydroxide precipitate.

2. A process as claimed in claim 1 wherein the cathode in said cathode compartment is hollow.

3. A process as claimed in claim 1 wherein the anodes in said anode compartment are made of high silicon content iron.

4. A process as claimed in claim 1 further including the steps of:
    (e) reducing said iron hydroxide precipitate with a reducing agent, and
    (f) magnetically recovering the high content iron filings produced by said reduction.

5. A process as claimed in claim 4 wherein said hydrogen evolved in said cathode compartment is used as said reducing agent.

6. A process as claimed in claim 1 further including the step of preoxidizing said acid mine water prior to introducing it into said cathode compartment.

7. A process as claimed in claim 6 wherein said preoxidizing step is accomplished with said oxygen evolved in said anode compartment.

8. A process as claimed in claim 7 wherein said oxygen is converted to ozone prior to being used as the preoxidizer.

9. A process as claimed in claim 1 wherein said hydrogen and said oxygen are collected as by-products of the electrolysis.

10. A process as claimed in claim 1 further including the step of reintroducing a part of the filtered water obtained from the cathode compartment into said compartment for additional electrolytic treatment.

References Cited
UNITED STATES PATENTS

| | | | |
|---|---|---|---|
| 3,573,181 | 3/1971 | Cochran | 204—130 X |
| 3,616,337 | 10/1971 | Mather | 204—130 |
| 3,759,814 | 9/1973 | Nakagawa, et al. | 204—96 X |

JOHN H. MACK, Primary Examiner

A. C. PRESCOTT, Assistant Examiner

U.S. Cl. X.R.

204—130, 149, 152